Figure 1:
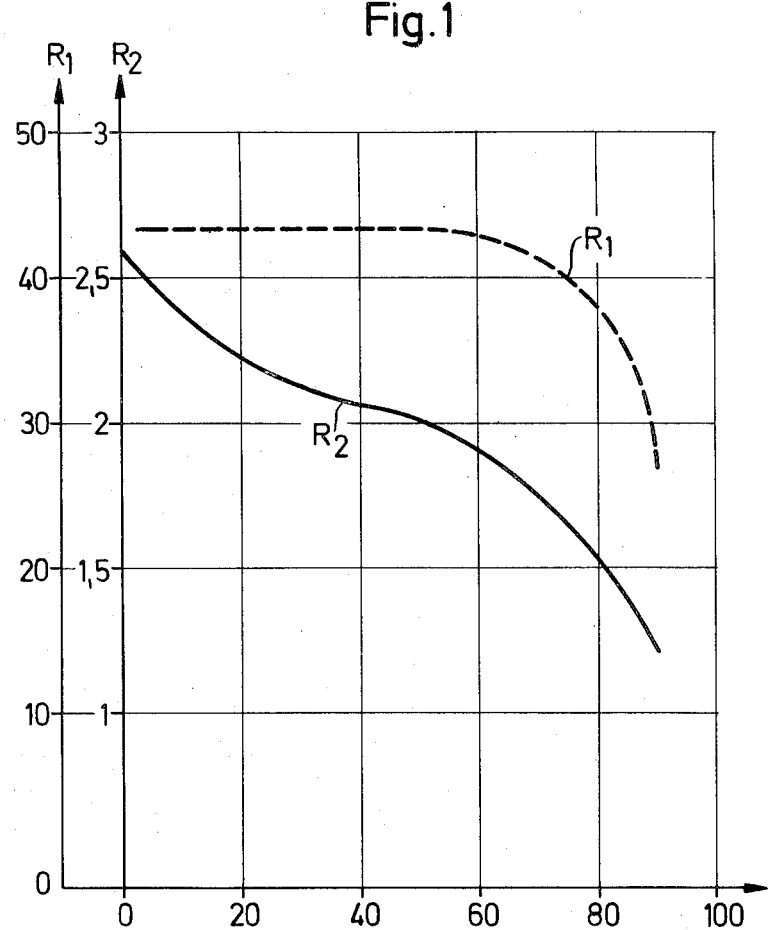

United States Patent [19]

Messina et al.

[11] 3,856,878

[45] Dec. 24, 1974

[54] PROCESS FOR THE ALKYLATION OF AROMATIC HYDROCARBONS

[75] Inventors: Giuseppe Messina, Alghero; Loreno Lorenzoni, Porto Torres; Natale Bertolini, Milan, all of Italy

[73] Assignee: Societa 'Italiana Resine S.I.R.S.p.A., Milan, Italy

[22] Filed: Nov. 15, 1973

[21] Appl. No.: 416,138

[30] Foreign Application Priority Data

Nov. 30, 1972 Italy .................................. 32270/72

[52] U.S. Cl........ 260/671 C, 260/671 R, 260/671 P
[51] Int. Cl.............................................. C07c 3/56
[58] Field of Search.......... 260/671 R, 671 C, 671 P

[56] References Cited
UNITED STATES PATENTS

| | | | |
|---|---|---|---|
| 3,277,195 | 10/1966 | Bodre.............................. | 260/671 R |
| 3,303,230 | 2/1967 | McMinn.......................... | 260/671 R |
| 3,470,261 | 9/1969 | Roberts........................... | 260/671 R |

*Primary Examiner*—C. Davis
*Attorney, Agent, or Firm*—Sughrue, Rothwell, Mion, Zinn & Macpeak

[57] ABSTRACT

Process for the alkylation of aromatic hydrocarbons by reaction of an olefin with an aromatic hydrocarbon in the presence of a complex catalyst comprising a metal halide and aromatic hydrocarbons, which comprises measuring the activity of the catalyst by determination of the ratio of the meta dialkylated derivatives to the sum of ortho and para disubstituted derivatives and adding fresh metal halide in such amounts that said ratio is maintained at predetermined values.

3 Claims, 4 Drawing Figures

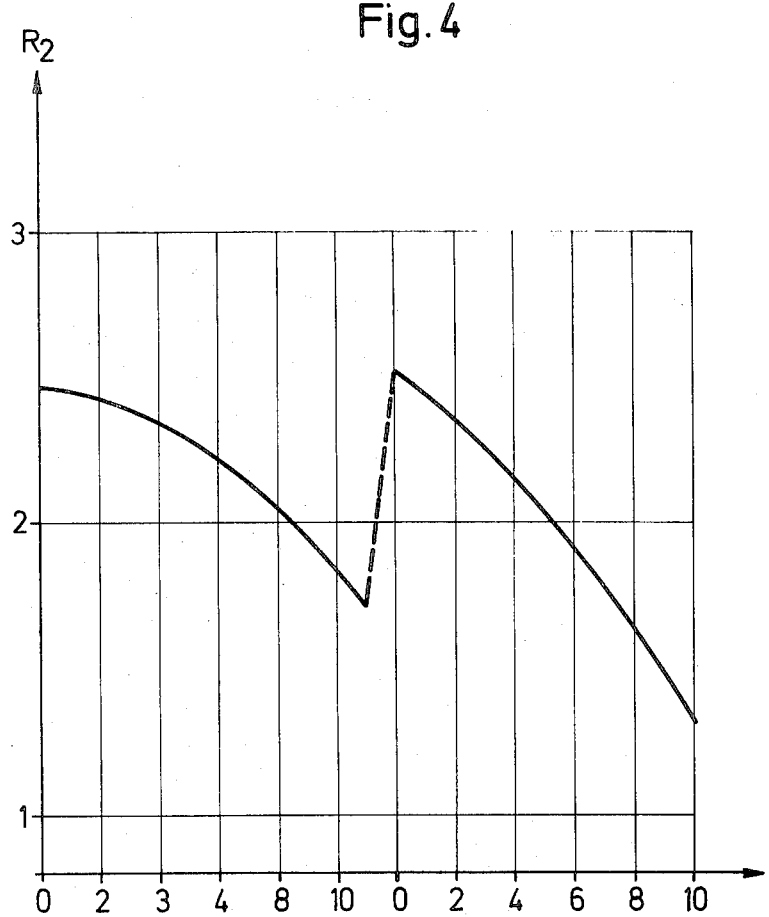

PROCESS FOR THE ALKYLATION OF AROMATIC HYDROCARBONS

The present invention relates to an improved process for the alkylation of an aromatic hydrocarbon in the presence of a complex Friedel-Crafts catalyst. More particularly, the invention relates to a method for the continuous determination and checking of the activity of the complex organometal halide catalyst, i.e. a complex comprising a metal halide and aromatic compounds during the alkylation of an aromatic hydrocarbon with an olefin.

The invention will be specifically described with reference to the synthesis of ethylbenzene by alkylation of benzene with ethylene in the presence of a complex aluminium trichloride catalyst and activators such as hydrochloric acid or ethyl chloride.

DESCRIPTION OF THE PRIOR ART

The reaction of an alkylating agent, such as an olefin or an alkyl halide, with aromatic compounds in the presence of a metal halide is well known and widely used in industry.

It is known that the active catalyst in this reaction is not the solid metal halide, but a complex comprising the metal halide and aromatic compounds.

This substance, which is commonly referred to as a "complex catalyst," resembles a heavy oil and has a variable composition depending on the substances present in the reacting system.

For example, in the production of ethylbenzene by alkylation of benzene with ethylene, the complex catalyst comprises the metal halide together with benzene, ethylbenzene, and polyethylbenzenes.

Under the usual working conditions, an aromatic hydrocarbon and an olefin are allowed to react in the presence of a complex aluminium trichloride catalyst to produce a liquid alkylation product.

In the preparation of ethylbenzene, the contact between the complex catalyst and the liquid alkylation mixture is ensured by the ethylene bubbling into the system as well as by mechanical agitators.

The complex catalyst is then easily separated from the liquid alkylation product by passage of the reaction mixture into a decanter.

The separation of the heavier phase consisting of the complex catalyst from the lighter phase consisting of the liquid alkylation product takes place in the decanter.

The complex catalyst is then recycled to the alkylation reactor.

It is known that the complex catalyst is poisoned by substances such as water, sulphur compounds, polynuclear aromatic compounds, etc.

For example, though commercial benzene is maintained at a relatively high purity and is dehydrated by azeotropic distillation, traces of moisture and other impurities are always present and destroy the activity of the catalyst.

A similar effect is caused by the heavy polyalkylated aromatic compounds formed as by-products in the alkylation reaction.

The complex catalyst thus loses its activity in a certain time, and a satisfactory level of catalytic activity is maintained in practice by continuous removal of a portion of the circulating complex catalyst, addition of fresh aluminium trichloride, and recycling of the catalyst activated in this way.

In the past, no methods were known for the measurement of the activity of the complex catalyst, and the additions of fresh aluminium trichloride were carried out quite empirically on the basis of the experience of the staff employed to operate the plant. Therefore, to ensure that the reaction did not come to a stop, quantities of fresh catalyst greater than those required were added.

To overcome this disadvantage, a number of techniques have recently been developed for the measurement of the activity of the complex catalyst, so that the addition of the aluminium trichloride can be carried out in a motivated and reasonable manner.

For example, the activity can be checked by measurement of the viscosity of the complex catalyst or by means of the fluorescence phenomena of the alkylation product.

SUMMARY

It has now been found, in accordance with the present invention, that the activity of a complex Friedel-Crafts catalyst used in the alkylation of an aromatic hydrocarbon with an olefin can be determined directly by determination of the concentrations, or preferably the ratios of the concentrations, of the dialkyl derivatives formed as byproducts in the alkylation reaction itself.

One object of the present invention is therefore a simple and sensitive method for the determination of the activity of an alkylation catalyst when an aromatic hydrocarbon is being alkylated with an olefin in the presence of a complex organo-metal halide catalyst.

Another object of the present invention is a method for continuous and accurate checking that allows the maintenance of the activity of a complex organo-metal halide catalyst in the alkylation reaction.

A further object of the present invention is a method for the determination of the activity of a complex organometal halide catalyst in the alkylation of an aromatic hydrocarbon with an olefin that allows the maintenance of a constantly high output of the alkylated product.

It is known that the disubstituted compounds are formed during the alkylation by further reaction of the monoalkylated products and by transalkylation phenomena, and that the extent of their formation is controlled by kinetic and thermodynamic factors.

The present invention is essentially based on the discovery that in an alkylation system in which fresh catalyst is not added the ratio of the quantity of the meta isomer to the sum of the quantities of the ortho and para dialkyl isomers decreases regularly with time both in the alkylation product and in the complex catalyst and finally shows a sudden decrease corresponding to the termination of the reaction.

For example, when ethylene is allowed to react with benzene in the usual molar ratios in the presence of three parts by volume of complex catalyst per part of alkylation mixture and without the addition of fresh aluminium trichloride, it is known that the ratio of meta diethylbenzene to the sum of the ortho and para isomers decreases continuously with time and undergoes a rapid drop corresponding to the deactivation of the catalyst.

In accordance with the process of the present invention, the activity of the complex Friedel-Crafts catalyst used in the alkylation of an aromatic hydrocarbon with an olefin is maintained at a high level by measurement of the ratio of the meta dialkyl derivative to the sum of the ortho and para isomers and addition of the metal halide in a quantity sufficient to maintain a predetermined value of the said ratio.

The advantages of such a procedure are numerous.

Thus by operation in the manner described, it is possible to check continuously the activity of the complex catalyst and hence to add only the quantity of metal halide necessary to maintain the desired activity.

It is also possible to carry out the alkylation with catalyst activities close to the termination activity with complete safety of operation, with the result that the maximum use is made of the catalyst and a considerable economic advantage is thus obtained.

It is also possible to automate fully the metal halide feed with mechanisms controlled by the apparatus used for the measurement of the activity of the catalyst.

Finally, the risk of termination of the reaction as a result of poisoning of the catalyst due to accidental introduction of deactivating substances into the reaction medium is avoided.

In comparison with the methods formerly used, the present invention first of all has the advantage that it allows easy and accurate measurement of the activity of the catalyst.

Moreover, it involves the measurement of values controlled by thermodynamic and kinetic parameters, and hence valid for all catalytic systems of the Friedel-Crafts type. Such measurements are also valid when the deactivation results from the accidental introduction of poisoning substances, such as carbon monoxide, acetylene, hydrogen sulphide, water, sulphur dioxide, mercaptans, etc., into the system.

The measurement of the ratio of the meta dialkylation product to the sum of the ortho and para isomers can be carried out by various analytical techniques such as the infrared technique and gas-liquid chromatography.

Accurate measurements of the said ratio are possible by the infrared technique.

However, the preferred system for the determination of the ratio is gas-liquid chromatography. It is extremely easy to effect the separation of the aromatic dialkylation products by means of chromatographic columns of various types, particularly columns with a partition liquid having low polarities. In this case the meta isomer separates from the other isomers, which give a single peak.

In the determination of the ratio of the dialkylated aromatic derivatives, therefore, one need only measure the areas of the corresponding peaks and then determine the ratio of the values of the said areas.

This can be carried out by a normal process chromatograph coupled with an integrator and a ratio measurer.

It is clear, moreover, that once the upper and lower limits of the ratio of the dialkylation products have been established for the operating conditions used, an automatic system can be designed for the metering of the fresh catalyst.

In other words, the aluminium trichloride feed can be controlled automatically by the instrument that measures the activity of the complex catalyst.

The measurement of the activity of the complex catalyst may be carried out on samples taken at the outlet from the industrial alkylation reactors, but for better control, it is preferable to use a system that carries out such measurements both at the inlet to and at the outlet from the reactors.

It is not advisable to carry out the measurement only at the outlet from the reactor, since this would not allow the detection of poisoning of the complex catalyst due to the introduction of contaminating substances with the reactants.

The above-mentioned measurements find application throughout the range of activity of the complex Friedel-Crafts catalyst; it is preferable in every case to carry out the alkylation in a range of values not very far from that in which deactivation of the catalyst occurs, in order to make the maximum use of the catalyst itself.

Thus in the case of the alkylation of benzene with ethylene, the preferred range is that in which the weight ratio of the meta diethylbenzene to the sum of the ortho and para isomers assumes values of from 1.5:1 to 2.1:1 in the alkylation product or from 1.8:1 to 2.3:1 in the complex catalyst.

Outside these values, one has either catalysts that are unnecessarily active or catalyst whose activities are too close to the termination activity or completely inactive catalysts.

The minimum and maximum values indicated for the ratio of the dialkylated isomers are indicative values, since variations are possible according to the operating conditions such as temperature, pressure, contact time, ratio of the reactants, and purity of the reactants themselves.

The alkylation of the aromatic compounds with olefins may be carried out in the most diverse ways while still remaining within the scope of the present invention.

The alkylation reaction may be carried out in any type of reactor suitable for the purpose, either continuously or discontinuously.

The apparatus and the technique used in the alkylation process are well known and do not form part of the present invention.

The reaction is generally carried out by introduction of the preformed complex catalyst, the benzene, the hydrochloric acid, and the ethylene, in the case of the formation of ethylbenzene, into the reaction zone held at a temperature of about 60° to 150°C.

The preferred temperatures vary from 70° to 90°C in particular when the reaction is carried out at ambient pressure. The higher temperatures are normally chosen when the pressure used during the alkylation is above atmospheric pressure.

Still in the production of ethylbenzene, one normally uses a quantity of complex catalyst of from 1 to 3 parts by weight per part by weight of alkylation mixture while the weight ratio of benzene to ethylene is maintained in the range from 4:1 to 7:1.

The quantity of halohydric acid, generally hydrochloric acid, normally used as a promotor of the alkylation reaction, may vary from 1 part by weight per 1000 parts by weight of ethylene to 1 part by weight per 10 parts by weight of ethylene.

After the magnetic stirrer of the reactor and the pump for the recycling of the complex catalyst have been started up, the temperature of the reactor is brought to 83° to 85°C by means of the oil circulation. The following are then fed to the reactor: hydrochloric acid at a rate of 0.5 grams/hour, the mixture of benzene and polyethylbenzenes (weight ratio 6.35:1) at a rate of 360 grams/hour, and ethylene at a rate of 40 grams/hour. The other conditions with the reaction proceeding are: rate of recycling of the complex catalyst 1500 grams/hour and weight ratio of complex catalyst to alkylation product 3:1.

Samples of the complex catalyst and of the alkylation product are removed at regular intervals. These samples are analysed to determine the ratio of the meta diethylbenzene to the sum of the ortho and para isomers.

It has thus been possible to correlate the variation of these ratios with the aging of the catalyst and the yield of ethylbenzene.

Figure 2:
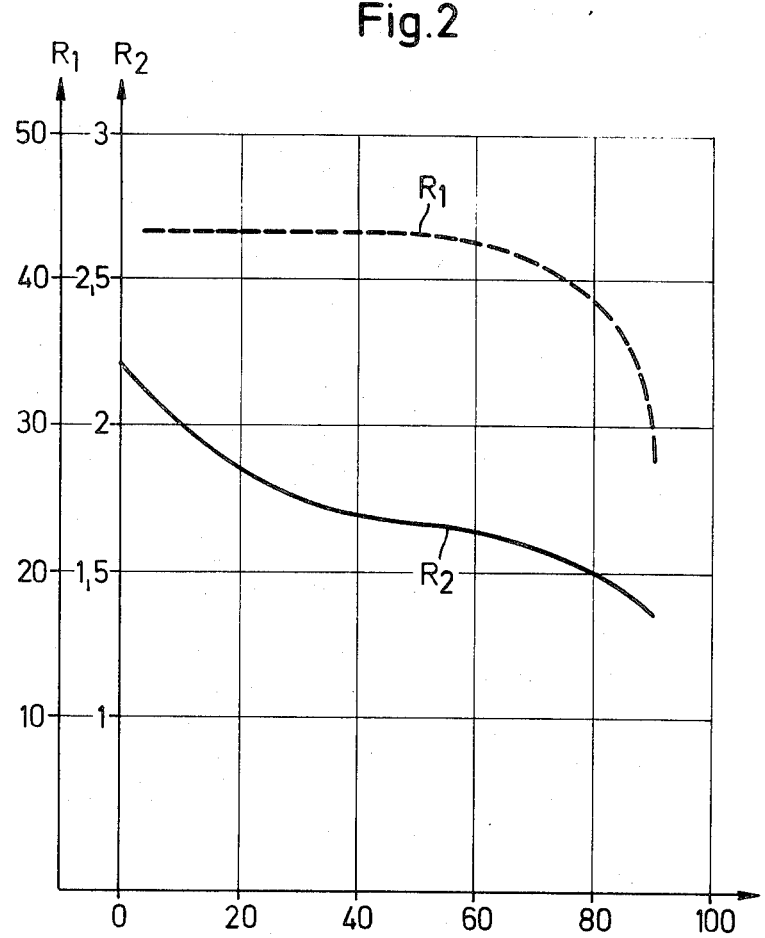

The experimental data found are shown in Table 1 and in the attached FIGS. 1 and 2.

More particularly, the time in hours is given in the table under A, the weight ratio of meta diethylbenzene to the sum of the ortho and para isomers in the complex catalyst under B, the same ratio in the alkylation product under C, and the yield of ethylbenzene expressed as the percentage by weight of ethylbenzene in the alkylation product under D.

FIG. 1 shows the variation, with time, of the ethylbenzene yield and of the weight ratio of meta diethylbenzene to the sum of the ortho and para isomers found in the complex catalyst.

The invention is further illustrated by the following non-limiting examples.

EXAMPLE 1

The apparatus used consists of

A glass reactor with a capacity of 350 ml, fitted with an oil-circulation thermostat and an electromagnetic stirrer.

A glass decanter connected to the reactor, with a capacity of 750 ml, for the separation of the liquid alkylation product (light phase) from the complex catalyst (heavy phase).

Three glass columns packed with Raschig rings, connected in series. The complex catalyst (coming from the decanter) is fed into the top of the first of said columns in such a way as to strip any ethylene not converted in the reactor. The complex catalyst then flows into the alkylation reactor. The liquid mixture of benzene and polyethylbenzenes is fed into the top of the second column in such a way as to strip the hydrochloric acid that has escaped from the first column. This liquid mixture also flows in the alkylation reactor. In the third column, any acid not solubilized in the preceding columns is stripped with water.

Two metering pumps, the first for recycling of the complex catalyst and the second for charging of the mixture of benzene and polyethylbenzenes.

Means for feeding ethylene and hydrochlorid acid to the alkylation reactor.

750 grams of complex catalyst and 250 grams of akylation product from an earlier reaction for the preparation of ethylbenzene from ethylene and benzene are introduced into the apparatus.

The catalyst was prepared from alkylation product, aluminium trichloride, and hydrochloric acid.

Table 1

| A | B | C | D |
|---|---|---|---|
| 0 | 2.553 | 2.215 | — |
| 3 | 2.450 | — | — |
| 6 | — | 2.040 | 42.80 |
| 9 | 2.523 | — | — |
| 12 | — | 1.995 | — |
| 15 | 2.380 | — | 43.40 |
| 18 | — | 1.910 | — |
| 21 | 2.220 | — | — |
| 24 | — | 1.845 | 43.82 |
| 27 | 2.150 | — | — |
| 30 | — | 1.775 | — |
| 33 | — | — | 43.25 |
| 36 | — | 1.728 | — |
| 39 | 2.070 | — | — |
| 42 | — | 1.685 | 42.80 |
| 45 | — | — | — |
| 48 | — | 1.680 | — |
| 51 | 2.03 | — | 43.40 |
| 54 | — | 1.650 | — |
| 57 | — | — | — |
| 60 | 1.88 | 1.625 | 43.50 |
| 66 | — | 1.601 | — |
| 69 | 1.740 | — | 41.5 |
| 72 | — | 1.570 | — |
| 75 | — | — | 40.07 |
| 78 | 1.550 | — | — |
| 81 | — | 1.500 | 38.35 |
| 84 | 1.450 | — | — |
| 87 | 1.32 | — | 33.51 |
| 90 | 1.22 | 1.340 | 28.10 |

The same variation is shown in FIG. 2 and the said ratio is determined in the alkylation product. In the figures, the time in hours is plotted on the abscissa, while the values of the yield of ethylbenzene ($R_1$) and of the ratio of the diethyl derivatives ($R_2$) are plotted on the ordinate.

EXAMPLE 2

A liquid complex aluminium trichloride catalyst is prepared by reaction of metallic aluminium and hydrochloric acid in the presence of a hydrocarbon alkylation product formed in the alkylation reaction of benzene with ethylene and having the following composition: ethylbenzene 47%, benzene 40%, polyethylbenzenes 13% by weight.

Figure 3:
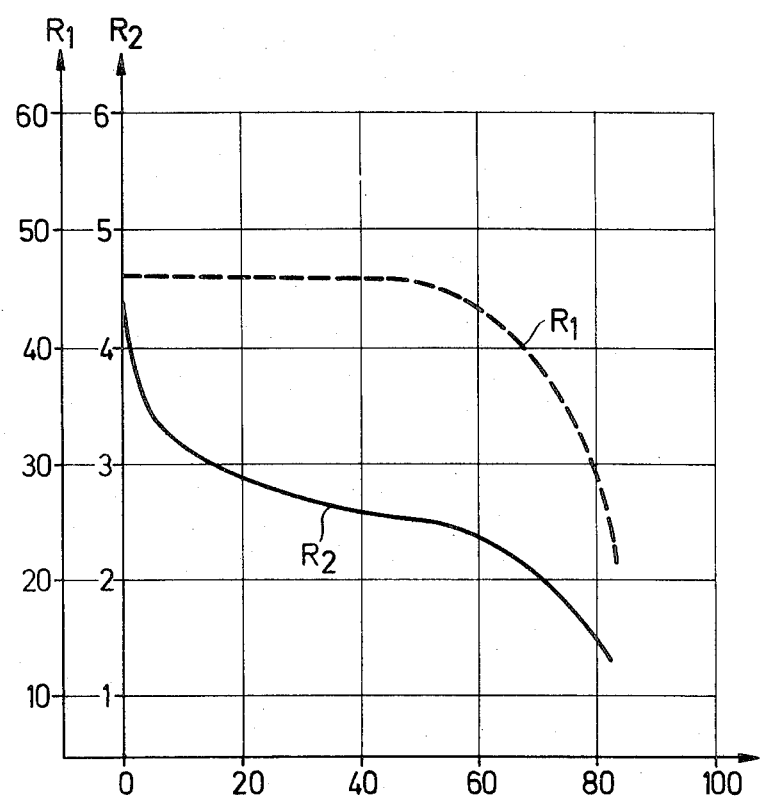

The procedure described in Example 1 is then followed, and the results are shown in FIG. 3.

In particular, the weight ratio of meta diethylbenzene to the sum of the ortho and para isomers found in the complex catalyst is shown in FIG. 3.

In this figure $R_1$ and $R_2$ have the same meaning as in FIGS. 1 and 2.

EXAMPLE 3

The operation is carried out under the conditions of Example 1, exhausting the complex catalyst from an earlier alkylation and then activating it by addition of fresh aluminium trichloride.

The course is shown in FIG. 4, in which the time in hours is plotted on the abscissa and the value of the weight ratio ($R_2$) of meta diethylbenzene to the sum of the ortho and para isomers found in the complex catalyst on the ordinate.

What we claim is:

1. A process for the alkylation of aromatic hydrocarbons by reaction of an olefin with an aromatic hydrocarbon in the presence of a complex catalyst comprising a metal halide and aromatic hydrocarbons, in which the activity of the complex catalyst is maintained by addition of fresh metal halide, characterized in that the activity of the catalyst is measured by determination of the ratio of the meta dialkylated products to the sum of ortho and para dialkylated derivatives in the complex catalyst or in the liquid alkylation product and fresh metal halide is added to the complex catalyst in such amounts as to maintain said ratio at predetermined values.

2. A process according to claim 1, characterized in that monoalkylated aromatic hydrocarbons are prepared.

3. A process according to claim 1, characterized in that ethylene and benzene are reacted in the presence of a complex catalyst containing aluminium chloride to give ethylbenzene and polyethylbenzenes.

* * * * *